United States Patent [19]

Mower

[11] Patent Number: 5,090,837
[45] Date of Patent: Feb. 25, 1992

[54] PERMANENT FASTENER-FREE POLE JOINT

[75] Inventor: Barry D. Mower, Riverdale, Utah

[73] Assignee: Lifetime Products, Inc., Clearfield, Utah

[21] Appl. No.: 421,584

[22] Filed: Oct. 16, 1989

Related U.S. Application Data

[63] Continuation-in-part of Ser. No. 257,755, Oct. 14, 1988, abandoned.

[51] Int. Cl.$^5$ .............................................. F16B 7/00
[52] U.S. Cl. ................................... 403/334; 403/282; 403/361
[58] Field of Search ............... 403/334, 333, 282, 300, 403/361, 383, 273, 345, 377, 277, 285, 292, 109; 285/332, 381, 332.1

[56] References Cited

U.S. PATENT DOCUMENTS

| | | |
|---|---|---|
| 169,181 | 10/1875 | Leonard . |
| 2,457,908 | 1/1949 | Meyerhoeffer . |
| 2,500,720 | 3/1950 | Van Der Heem . |
| 3,614,143 | 10/1971 | Stevens . |
| 3,830,008 | 8/1974 | Johnson . |
| 3,936,206 | 2/1976 | Meisberger . |
| 4,061,367 | 12/1977 | Moebius . |
| 4,627,146 | 12/1986 | Ward . |
| 4,769,897 | 9/1988 | Moseman . |

FOREIGN PATENT DOCUMENTS

| | | |
|---|---|---|
| 1012572 | 7/1957 | Fed. Rep. of Germany . |
| 2257389 | 6/1974 | Fed. Rep. of Germany . |
| 261156 | 5/1970 | U.S.S.R. . |

*Primary Examiner*—Peter M. Cuomo
*Attorney, Agent, or Firm*—Craig J. Madson; L. Craig Metcalf

[57] ABSTRACT

A joint structure for joining two pole members is disclosed. A female component of the structure is formed on a first end of a first pole member. At least one, and in some embodiments two, diverging segments are provided on an end of pipe member to form the female component of the joint. A complementing male component is formed on an end of another pipe member. The male component includes at least one, and in some embodiments two, converging segments. The values of the angles and lengths of the converging and diverging segments are preferably as close to each other as possible. The joint structure can be adapted to allow pole members of many different shapes, sizes, and materials to be securely joined together without the need of fasteners such as bolts. Once assembled, the joint structure resists disassembly and lateral deflection of the pole members and provides for long service even under rigorous use.

51 Claims, 6 Drawing Sheets

PERMANENT FASTENER-FREE POLE JOINT

RELATED APPLICATIONS

This application is a continuation-in-part of U.S. Pat. application Ser. No. 07/257,755, filed Oct. 14, 1988, now abandoned, naming Barry D. Mower as inventor and entitled Double Taper Pole Joint.

BACKGROUND

1. Field of the Invention

This invention relates to structures used to join together two sections which together comprise a completed length pole. More particularly, the present invention is directed to structures formed on the ends of two pole member sections to allow the sections to be securely and permanently joined together without the need for fastening devices.

2. The Background of the Invention

It is common in many aspects of everyday life and commerce to require the joining of two pole-like members of some kind. Applications for such members may include light poles, flag poles, sporting equipment standards such as those used to support volleyball and badminton nets, basketball goal standards, tent poles, scaffolding supports, and a multitude of other types of poles and supports.

It is often the case that the original length of a pole is so great that it cannot be transported and stored conveniently. For example, pole supports used for backpacking tents must be broken down to several shorter sections for transportation and then reassembled prior to use.

Another example are basketball goal standards which are often shipped in lengths of only three to five feet and which must be assembled and embedded into several feet of earth to provide an upright which is between eight and ten feet high. Other examples of poles which may need to be stored and shipped in several short sections and assembled on site include flag poles and canopy supports.

Importantly, it is usually the case that pole supports for backpacking tents and the like must be capable of seizure free assembly and disassembly. That is, the joint must be easy to assemble and disassemble but yet also remain secure enough to resist inadvertent disassembly. In contrast, pole members used to construct basketball standards are generally intended to be permanently assembled and, once assembled, not disassembled. Both types of applications have particular problems which prior art devices have not adequately solved.

Pole members used in the described applications may be of a uniform outer and inner diameter along their entire length. Alternatively, the sections to be joined may be of different diameters. As used herein, the phrase "pole member" is intended to include any elongated pole-like member which must be joined to another pole-like member in order to increase the overall length of the assembled pole.

Figure 1:
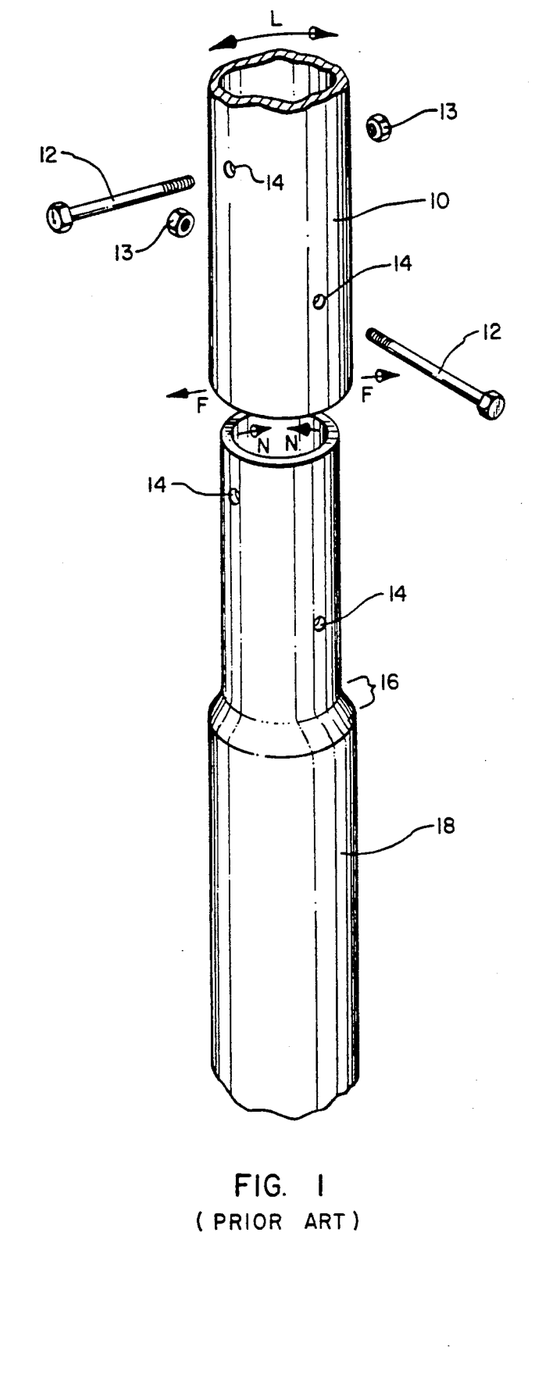
FIG. 1 is an exploded perspective view of a prior art structure.

One prior art method of joining two pole sections is shown in FIG. 1. While the structure shown in FIG. 1 may be commonly used to join two pole sections such as a basketball goal standard, it suffers from several serious drawbacks as explained below.

First, due to imprecise formation of the joint, the upper pole member 10 is allowed to rock back and forth. Furthermore, as lateral forces are applied to the sections, in the direction of arrow L, the circumference of the lower end of the upper section 10 begins to flare in the direction indicated at arrows F in FIG. 1. Also, the upper end of the lower section 18 becomes narrowed in the direction indicated at arrows N in FIG. 1. The resulting flaring and narrowing, which accelerates as the pole is used more rigorously, causes the joint to loosen so that the joint is no longer able to keep the poles in lateral alignment, i.e., the pole tilts and wobbles. This problem is particularly severe when relatively thin walled tubing is used. Thus, in most cases, the upper pole section 10 wobbles back and forth in a very unsatisfactory manner even before the pole has been subjected to any use and wear.

Second, single reduced diameter segment 16 of the pole joint represented in FIG. 1 is generally formed by swaging one end of the lower section. But it is common for the diameter and wall thickness of the pole material to vary. Variations in diameter and wall thickness of the upper pole member 10 can cause a joint which is impossible to assemble or which is very unstable if the variations exceed very small values.

Third, it is common to form tubular pole members by rolling a tube from flat sheet of material and butt welding the resulting seam. When using tubular pole sections formed in this way, the seam of the pole member often protrudes from the surface of the section. When a protruding weld seam is encountered by a structure such as shown in FIG. 1, at best, an unstable joint is the result, and in the worst case, the upper and lower pole members will not fit together. Fourth, when pole sections are formed, burrs are often left where the section was cut. Such burrs once again can cause an unstable joint when the structure represented in FIG. 1 is used.

In an effort to overcome the drawbacks mentioned above, prior art solutions have required the use of bolts 12 and nuts 13 or other fasteners and pre-drilled holes 14 to secure the upper and lower sections together. The use of bolts, screws, or other fasteners, however, adds cost to the joint, inconvenience to the user, requires tools for assembly and disassembly, and often compounds problems due to flaring as indicated at arrow F in FIG. 1 since the lower end of the upper pole member 10 no longer has a perimeter contact with the tapered segment 18. Moreover, screws present at such a joint are aesthetically unsightly, and make an unsafe joint with sharp protrusions as well as requiring occasional retightening as the screws loosen.

Due to the inherent instability of such joints, manufacturers often attempt to fabricate such joints to tight tolerances which results in greater expense and a joint which is often difficult to assemble and still does not overcome the above described problems.

Another prior art structure requires that the lower pole section be provided with a long upwardly directed, continuous male taper which ends with a diameter much smaller than the original diameter of the pole. In such an arrangement, the upper pole section is provided with a correspondingly long female taper. Such long continuous tapers, however, are difficult and expensive to form and tend to more or less suffer from the same drawbacks as the joint illustrated in FIG. 1 depending upon the dimensions of the joint and the intended application of the joint.

Moreover, many of the prior art joints are often not intended to be used as a permanent joint but are specifically designed to be "seizure free," i.e., relatively easy to disassemble. Such joints generally perform inadequately either as a permanent joint or as a joint which merely resists inadvertent disassembly. A still further difficulty present in the prior art is that the structures which have been used to form joints on thin wall steel tubing have not recognized the particular problems which must be dealt with when dealing with thin walled tubing.

In view of the drawbacks and disadvantages found in the prior art, it would be an advance in the art to provide a pole joint structure which is secure and resists wear and loosening under long and heavy use. It would also be an advance in the art to provide a pole joint structure which may be assembled without the need for any tools or fasteners.

It would be a further advance in the art to provide a pole joint structure which alleviates problems with varying wall thickness, seam weld variations, and other manufacturing imperfections as well as being simple and inexpensive to form on a variety of pole section ends. It would also be an advance in the art to provide a pole joint structure which forms a permanent joint between two pole members. It would be a still further advance in the art to provide a pole joint structure particularly suited for use with thin wall steel tubing.

OBJECTS AND BRIEF SUMMARY OF THE INVENTION

In view of the above described drawbacks and disadvantages found in the prior art, it is a primary object of the present invention to provide a pole joint structure which allows two pole members to be securely joined and prevent any lateral deflection of the poles even after long periods of use.

It is another object of the present invention to provide a pole joint structure which may be easily assembled and which remains secure with few, if any, fasteners.

It is yet another object of the present invention to provide a pole joint structure which may be permanently assembled without any fasteners.

It is a further object of the present invention to provide a pole joint structure which allows poles of the same or different diameters to be joined.

It is still another object of the present invention to provide a pole joint structure which is aesthetically attractive and does not present any unsafe protrusions from the joint which may cause injury to persons coming in contact with the joint.

It is another object of the present invention to provide a pole joint structure and method wherein the structure may be simply and inexpensively manufactured and easily assembled.

It is a still further object of the present invention to provide a pole joint structure which forms a friction weld between the two pole members which becomes more secure with use.

It is yet another object of the present invention to provide a pole joint structure which is particularly suited for use with thin wall steel tubing.

These and other objects of the present invention will be best appreciated by an examination of the following disclosure and by practicing the invention.

The present invention is a structure which is formed on the ends of first and second pole members to provide a female joint component and a male joint component which, when joined together, form a pole joint which remains secure even during rough use over a long period of time. The present invention has particular application in joining pole sections which together form a basketball goal standard and other similar structures.

In contrast to prior art structures which only provide a non-tapered reduced diameter surface on one pole member, some of the embodiments of the present invention described herein provide that both pole members will contact each other at two perimeter rings somewhere along the length of the pole members. Furthermore, rather than a perimeter ring, the embodiments of the present invention preferably provide two planar contacts between the pole members being joined.

When planar contact surfaces are provided, they preferably encompass a substantial portion of the perimeter of the pole members. Having two contact surfaces on each pole member, each being separate from one another, allows the pole members to be securely joined so as to resist any lateral deflection.

Some of the embodiments of the present invention include two diverging segments and two converging segments on upper and lower pole members, respectively. In these embodiments, a female component formed on an upper pole member. A first diverging segment is provided on the inner surface of the female component and is spaced a distance from the end of the first pole member. When cylindrical pole members are used, the first diverging segment can be described as a truncated conical or frusto-conical shape with the base of the cone positioned away from the joint end of the first pole member.

The first pole member is also provided with a second diverging segment located on the inner surface of the female recess and is positioned adjacent to the first end of the first pole member. It is preferred in some embodiments that a substantially straight segment be provided between the first diverging segment and the second diverging segment on the first pole member. The structures provided on the first pole member comprise the female component of the joint structure.

Concerning still the emodiments including two diverging and two converging segments, a second pole member is provided with the male components of the joint structure. The male components include a first converging segment provided on the outer surface of the second pole member. A second converging segment is also provided on the outer surface of the second pole member which is spaced a distance from the second end of the second pole member.

Similarly to the female component, the male component structures of some embodiments are preferably provided with a substantially straight segment which separate the first converging and second converging segments. When a substantially straight segment separates the mating surfaces of the joint structures, the substantially straight segments provided on both the male and female components should be substantially equal in length. Moreover, the angles provided on the mating surfaces of the converging segments may be equal to, or somewhat different than, the angles provided on the corresponding mating structures on the diverging segments.

According to the present invention, the planar contact surfaces are oriented at an angle in relation to the central axis of the pole members. In order to form a joint which cannot be easily disassembled, the angle of the tapers which form the converging and diverging segments is very shallow, between a fraction of one degree to several degrees. If the joint must be disassembled easily, the angle may be much greater so that the fit of the joint is not as tight. Advantageously, embodiments of the present invention may be formed which require only one, or no, fasteners to hold the joint securely together.

Since embodiments of the present invention provide each pole member with planar contact with the other pole member, the poles may be securely joined together without the need for fasteners such as bolts if desired. Moreover, the structure of the present invention may be adapted for use with pole members fabricated from many different materials and of many different shapes.

In some embodiments of the present invention, only a single diverging segment is provided on a first pole member while a single converging segment is also provided on a second pole member. By selecting the appropriate angle of divergence and angle of convergence, and the proper length of the diverging and converging segments, a friction weld pole joint may be formed.

The embodiments which include a single tapered segment on each of the male and female components may advantageously be fabricated economically and provide a permanent joint which is easily assembled and is particularly suited to remain secure under the stresses encountered when used as an outdoor basketball standard. Furthermore, the embodiments disclosed herein are very advantageous for use with thin wall tubing.

While a pole member of any shape may be provided in the joint structures of the present invention, it is expected that pole members of generally cylindrical shape will find the greatest use for the present invention.

DETAILED DESCRIPTION OF THE PREFERRED EMBODIMENTS

In the following description, similar reference characters will be used to refer to like structures. It should also be appreciated that the embodiments represented in the drawings are just a few of the possible embodiments of the present invention and that the present invention may be carried out by structures other than those illustrated and described herein.

The embodiments illustrated in the accompanying figures are primarily intended for use with pole members which, when joined together, will serve as basketball goal standards, volleyball and badminton net supports, other similar supports used with sporting equipment, as well as poles which are suitable for use in personal, business, recreational, and other applications.

Many of the embodiments described herein form permanent self-tightening joints particularly suitable for fabrication on thin wall steel tubing. Thin wall steel tubing, in contrast to steel pipe, provides a strong and reletively light-weight material which has been generally unused to form basketball goal standards. Importantly, embodiments of the present invention may have many applications other than those specifically mentioned herein.

Since it is impractical to ship or carry full-length pole members used for many applications such as those just mentioned, it is important to provide the end user with pole sections which may be easily assembled into the full length pole. Since many of the end users have access to only a limited variety of tools, the assembly steps preferably must require a minimum number of, if any, common tools. The present invention fulfills these goals by providing a structure which allows two pole sections to be quickly and easily joined together.

Figure 2:
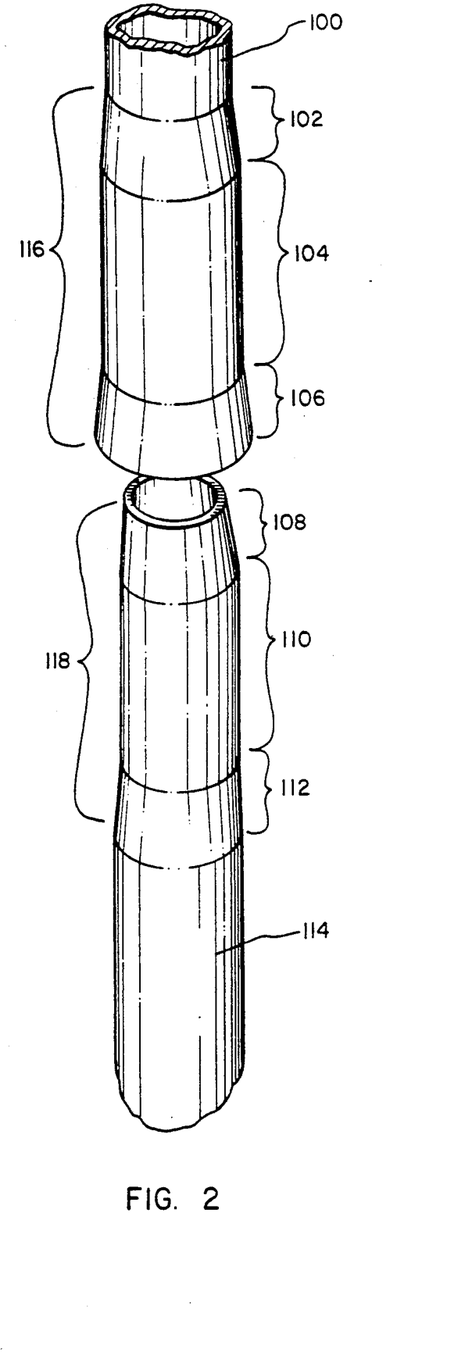
FIG. 2 is an exploded perspective view of a first presently preferred embodiment of the present invention.

Reference will now be more particularly made to FIG. 2 which is an exploded perspective view of the first presently preferred embodiment of the present invention.

In the figures used to illustrate the presently preferred embodiments it has often been necessary to exaggerate the size or orientation of the structures for emphasis or clarity. Thus, for example, the angles and relative dimensions represented in the drawings may not match those provided in the description.

FIG. 2 shows a first pole member 100 and a second pole member 114 each provided with the structures of the present invention which together allow the two pole members to be securely joined together. In the description which follows, the first pole member 100 will be referred to as the "upper pole member" and the second pole member 114 will be referred to as the "lower pole member."

While most applications of the present invention will involve pole members joined together to form a vertical pole or standard, the present invention has application in situations where the joined pole members are other than vertical and in which the positions of first pole member 100 and second pole member 114 are reversed. Thus, use of the terminology "upper" and "lower" pole members in this description is intended to make reference to the described structures easier and clearer while not of themselves intending to limit the scope of the present invention. Moreover, it should be appreciated that when poles are used in other than a vertical position, it is more likely that a fastener will be necessary to ensure that the joint remains tight during use.

As can be seen in FIG. 2, upper pole member 100 is provided with the female component of the joint structure, designated by bracket 116, while the lower pole member 114 is provided with the male component of the joint structure, designated by bracket 118. As suggested in FIG. 2, in order to join the two pole members, the male component 118 of lower pole member 114 is inserted into the female component 116 provided on upper pole member 100.

It should be appreciated that the upper pole member 100 and the lower pole member 114 may be fabricated from many different materials and may be of many different sizes. For example, one preferred application of the embodiment illustrated in FIG. 2 is a basketball goal standard. In such an application, it is customary to use 3½ inch diameter steel tubing having a wall thickness of either 0.072 inches (15 gauge) or 0.065 inches (16 gauge).

Such tubings are referred to as thin-wall tubing which is distinguished in the art from steel pipe. Significantly, it has been unrecognized in the art that thin-walled tubing can be utilized for formation of joints such as those described herein. Due to the very small width which is available in the thickness of tubing wall (generally much less than one tenth of an inch) it has been conventional wisdom in the art that suitable structures could not be formed thereon.

While the present invention may be incorporated into poles fabricated from any number of materials including a variety of metals, plastics, fiberglass, composite materials, and any number of materials present now in use, or developed in the future, the presently preferred material is thin-wall steel tubing. Still further, the present invention allows the small, but troublesome, dimensional variations found in thin-wall tubing to be corrected during the formation of the joint structures. Thus, the present invention has the heretofore unrecognized advantage of being suitable for use with thin-wall tubing. Such thin wall tubing has the advantage of low cost while still providing a strong pole member.

Moreover, while the embodiments illustrated herein represent the pole members as being tubular, it is within the scope of the present invention to utilize solid pole members which have the female component 16 formed within an interior recess. Still further, it will be appreciated that the pole members may be of a shape other than cylindrical. For example, pole members having a cross-sectional area which is generally square, rectangular, triangular, or any polygonal shape may be used in accordance with the present invention.

Those skilled in the art will be able to appreciate that as different materials and shapes of the pole members are used, modifications may be required in order to provide the best results for any particular application. Those skilled in the art will be able to readily make such modifications with knowledge of the teachings contained herein.

As indicated in FIG. 2, the female component 116 is provided with a first diverging segment 102, a second diverging segment 106, and a substantially straight segment 104 which separates the diverging segments. The diverging segments 102 and 106 may also be referred to as outward tapered segments. As can be seen best in FIG. 2, diverging segments 102 and 106 in the first embodiment can be best described as having a frusto-conical shape with the base of the cone formed in the direction of the bottom end of upper pole member 100.

Diverging segments 102 and 106 are so named because they diverge from the central axis of the pole member. Also, when the diverging angles of the diverging segments 102 and 106 are specified, or the angles of similar structures, the angle can be measured with respect to the central axis of the pole members or with respect to a surface which is substantially parallel to the central axis, for example, the outer wall of pole member 100.

Similarly, the male component 118 is provided with a first converging segment 108, a second converging segment 112, and a substantially straight segment 110 which separates the converging segments. The converging segments 108 and 112 may also be referred to as inward tapered segments. Similarly to the diverging segments, the converging segments 108 and 112 may also be described as having a frusto-conical shape with the base of the cone directed toward the top end of the lower pole member.

The function of the diverging and converging segments is to provide a joint with at least two circular, and preferably planar, contacts. The relationship between the mating surfaces of the converging and diverging segments can be best explained by reference to FIGS. 3A and 3B.

Figure 3A:
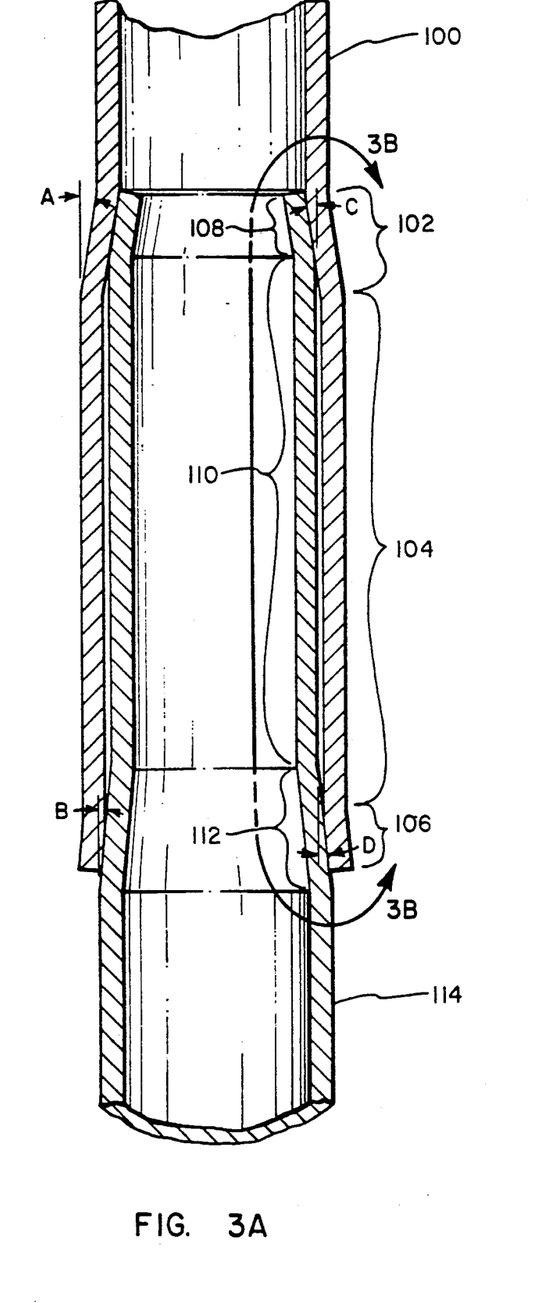
FIG. 3A is a cross-sectional view of the embodiment illustrated in FIG. 2.

Provided in FIG. 3A is a cross-sectional view of the first presently preferred embodiment represented in FIG. 2. In FIG. 3A, the relationship between the first converging segment 108 and the first diverging segment 102 can be seen. Likewise, the relationship between the second converging segment 112 and the second diverging segment 106 can also be examined.

Importantly, the mating which occurs between the exterior circumference of the converging segments and the interior circumference of the diverging segments provides that the joint structure includes two planar surface contacts between each pole member at the joint. It shall be readily apparent to those skilled in the art that providing two contacts, whether they be the preferable planar type contacts or the circular ring contacts, the two pole members joined by the joint will be best able to resist lateral deflection.

Depending upon the particular application, it is desirable to make the substantially straight segments 110 and 104 of a significant length. As straight segments 110 and 104 are lengthened, greater lateral stability for the joint will result. In some embodiments of the present invention, substantially straight segments 110 and 104 may be very short, or perhaps nonexistent, depending upon the surface area devoted to the diverging and converging segments and the configuration of the particular joint.

In the first embodiment illustrated in FIG. 3A, the converging and diverging angles, represented at angles A-D, are all equal. By fabricating the embodiment with all converging and diverging angles being equal, the maximum amount of surface area between the diverging segments and converging segments is allowed to mate thus providing the strongest possible joint. Alternatively, in some applications it may be advantageous to provide angles B and D with a first angular value and angles A and C with a different angular value.

In some applications it may be desirable to fabricate the mating angles so that a circular ring contact occurs between the two mating surfaces rather than a planar contact as shown in the drawings. For example, the first converging segment 108 may be oriented at a very low angle, e.g., one degree, while the diverging segment 102 is oriented at a higher angle, e.g., ten degrees. The described mismatch of angles would cause the end of the converging segment 108 to gouge the surface of diverging segment 102. Moreover, it will be appreciated that if the angles provided on the mating converging and diverging segments are not fabricated to match, either after fabrication, or due to severe damage, the contact between the diverging and converging segments will still provide a circular ring contact area sufficient to maintain the lateral stability of the joint.

Importantly, it can be seen in the cross-sectional view of FIG. 3A that only slight reduction or enlargement of either pole member from its original diameter is required. This is in dramatic contrast to one prior art structure which requires the forming of long continuously tapered surfaces to form a joint. Advantageously, the present invention avoids greatly enlarging the diameter of one pole member which, as is known in the art, greatly reduces the strength of the joint. Similarly, the present invention also avoids difficulties of fabrication which are inherent in greatly reducing the outer diameter of a pole member as is necessary in the continuous long tapered pole joint.

From the representation of the embodiment of FIG. 3A it will be appreciated that it is the interior mating surfaces of the female component and the exterior mating surface of the male component which must be fabricated according to the present invention. The interior of the lower pole member 114 and the exterior of the upper pole member 100 may take any shape which is desired. It may be, however, advantageous to utilize additional structures on the interior of pole member 114 and the exterior of pole member 100, such as ribs or a sleeve, in order to reinforce and strengthen the male and female components of the joint structure.

Converging and diverging angles, angles A-D in FIG. 3A, may be anywhere within the range from 0.1 degrees to about 25 degrees with a more preferred range being from about 0.25 degrees to about 15 degrees. A most preferred range for use with the illustrated embodiments is from about 0.5 degrees to about 8 degrees.

The converging and diverging angles may be selected so as to make the structure of the joint work best in the particular application for which it is intended. For example, if a permanent joint is desired, i.e., a joint which may only be separated with great difficulty, it is preferred that converging and diverging angles be approximately 1 degree when using three and one-half inch steel pipe. When using such angles on said pipe, straight segments 110 and 104 are preferably about three inches long with each of the diverging and converging sections being about one and one-half inches long.

If a joint structure which may be disassembled is desired, converging and diverging angles of approximately 4 degrees may be chosen. Generally, the greater the converging and diverging angles, the greater is the ease with which the joint may be disassembled. However, when some converging and diverging angles are used, a bolt or some other fastener may be necessary to prevent undesired disassembly of the joint while the structures of the joint still provide lateral stability. Those skilled in the art will appreciate that, depending upon the application and the materials used, it may be desirable to provide the outer surface of the male component and/or the inner surface of the female component with a friction-enhancing or friction-reducing surface treatment.

Figure 3B:
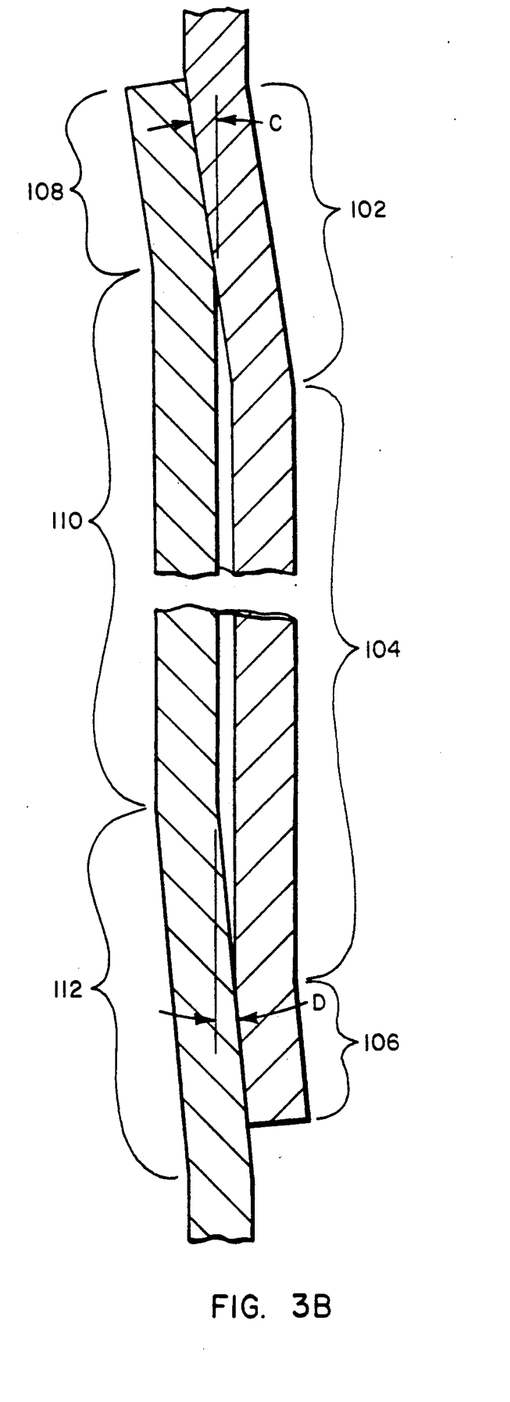
FIG. 3B is an enlarged cross-sectional view taken along line 3B—3B of FIG. 3A showing the mating surfaces in greater detail.

The interrelationship of the outer wall of the male component and the inner wall of the female component can be seen more clearly in the cross-sectional view of FIG. 3B. FIG. 3B shows in greater detail a cross-sectional view of one portion of the wall of pole members 100 and 114. In FIG. 3B, the first embodiment described herein is represented as having mating contact between the first converging and diverging segments 102 and 108, respectively, and the second converging and diverging segments 112 and 106, respectively. The substantially straight segments 110 and 114, while substantially parallel with one another, do not have mating contact between each other. While embodiments of the present invention may be fabricated with substantially straight segments 110 and 104 that do contact, it is preferred that such contact not occur between substantially straight segments as represented in FIG. 3B. When the substantially straight segments 110 and 104 do not contact, assembly of the joint is easier.

When tubular pole elements are used, as shown in FIG. 3B, it can be seen that the beginning and end points of each of the converging and diverging segments define a lateral deviation of between from about 20% to about 80% of the thickness of the tubular pole member wall. As shown in FIG. 3B, the total lateral deviation of both upper and lower pole member walls due to the deviation of the diverging and converging segments, respectively, does not exceed one wall thickness. This produces a pole joint structure which achieves the best balance between desirable structural attributes and an aesthetically pleasing appearance.

As should now be appreciated, the first presently preferred embodiment represented in FIGS. 2, 3A, and 3B provides a pole joint which can be used in many different applications and avoid problems encountered in previously available joint structures while being easier to use and costing less to manufacture.

Figure 4A:
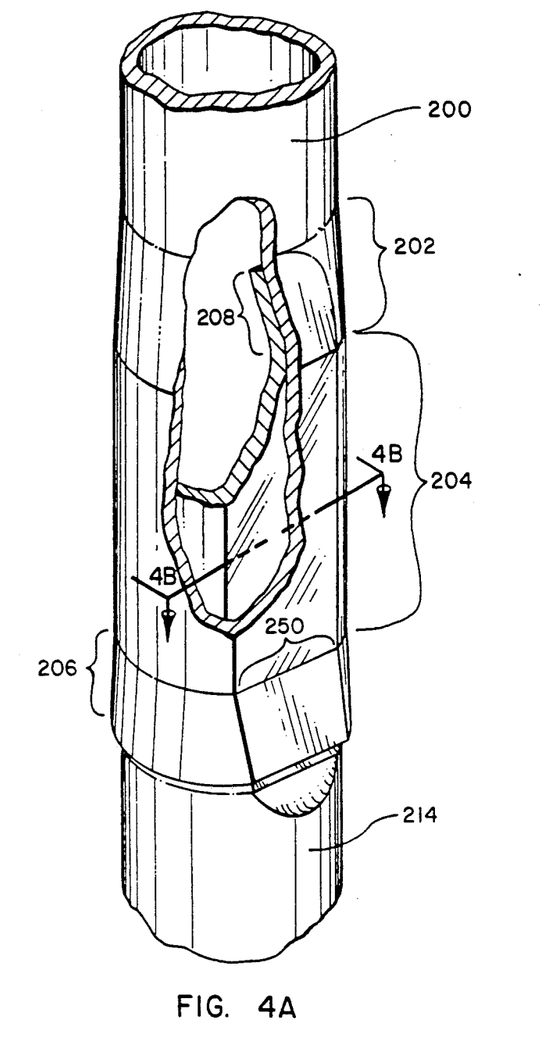
FIG. 4A is a perspective view of a second presently preferred embodiment of the present invention provided with a key structure.
Figure 4B:
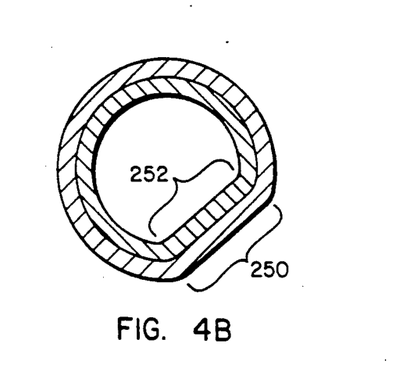
FIG. 4B is a cross-sectional view taken along line 4B—4B of FIG. 4A.

FIG. 4A and 4B illustrate a second presently preferred embodiment of the present invention including an upper pole member and a lower pole member joined together. The second presently preferred embodiment is particularly useful when two pole members must be joined together in proper rotational alignment. Because embodiments of the present invention may be difficult to disassemble once assembled, it may be important that the pole members be properly aligned at the time of assembly. Moreover, in some applications rotational forces are applied to the pole members. In such cases, the second embodiment illustrated in FIGS. 4A and 4B prevents rotation of the assembled joint.

In FIGS. 4A and 4B, a flattened key segment 52 and 50 is provided on the upper pole member 200 and lower pole member 214, respectively. As can be appreciated by examining FIGS. 4A and 4B, the key segment prevents pole members from being assembled unless they are in the proper rotational alignment with respect to each other. As illustrated in FIG. 4A, the second embodiment is provided with diverging segments 202 and 206, converging segments such as shown at 208, and substantially straight segments such as that shown at 204, all of which may be formed in accordance with the principles discussed in connection with the first described embodiment.

When the present invention is incorporated into a basketball standard, the self-aligning function of the second embodiment may be very helpful. As is common with basketball standards it may be that the upper pole member is provided with pre-drilled holes (not shown in the drawings) to facilitate mounting of the basketball backboard to the upper pole member. Thus, with the use of the second embodiment illustrated in FIGS. 4A and 4B, once the lower pole member has been properly fixed into the ground, the upper pole member will be properly positioned during the assembly process. Likewise, many other applications which require that the pole members be in proper rotational alignment may desirably include a key segment in the pole joint structure.

The key segments 250 and 252 illustrated in FIGS. 4A and 4B represent just one possible structure which may be used to provide a key structure on the male and female components of the joint structure. For example, the key segment may be of the same general shape but much smaller than indicated in the figures and still ensure proper rotational alignment of the two pole members.

Alternatively, various key means, one of which is the key segment illustrated in FIGS. 4A and 4B, may be utilized. Such key means can include a slot or a groove provided on one pole member with a corresponding screw or protrusion provided in the other pole member. Many other structures known to those skilled in the art may also be used as the key means.

Figure 5:
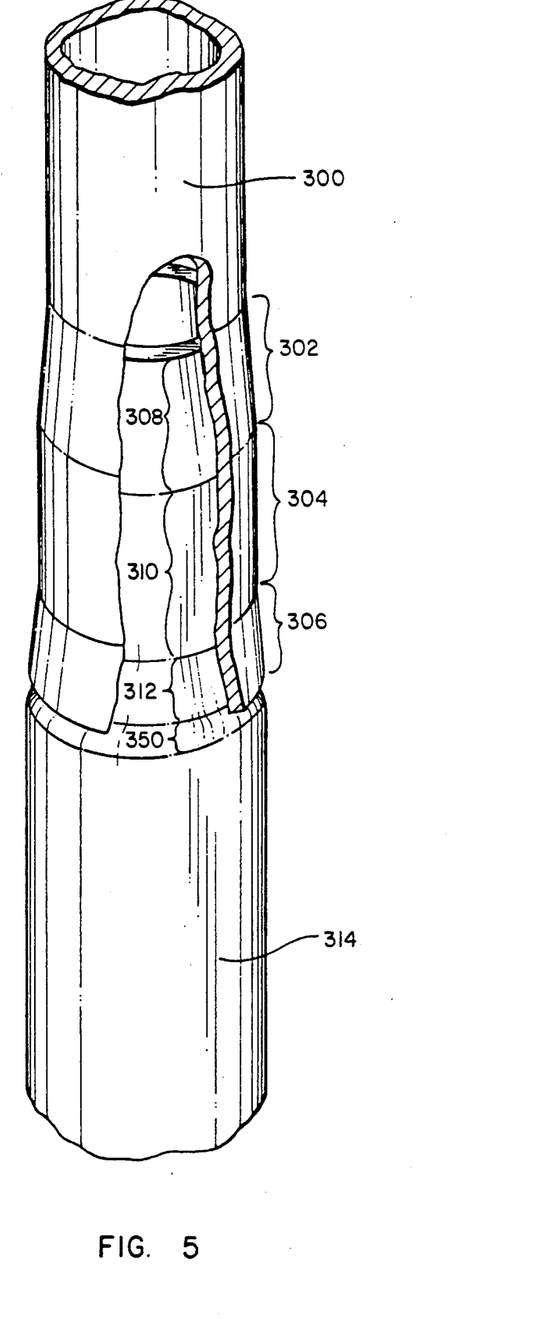
FIG. 5 is a partially cut-away perspective view of a third presently preferred embodiment of the present invention used to join pole members having different diameters.

FIG. 5 is a partially cut-away perspective view showing a third embodiment of the present invention. The embodiment represented in FIG. 5 shows a joint structure to be used with two different diameters of pipe or tube. As shown in FIG. 5, the third embodiment includes both an upper pole member 300 and a larger diameter lower pole member 314 together having a first converging segment 308, a first diverging segment 302, a second converging segment 312, a second diverging segment 306, and substantially straight segments 310 and 304. Importantly, the lower pole member is also provided with a reducing segment 350. The reducing segment does not provide a mating surface but functions to place the converging segments of the male component of the joint structure in proper relationship for mating with the diverging segments of the female component of the joint structure. If the larger diameter pole member is to be the upper pole member, the reducing segment may be fabricated on the upper pole member if called for by the particular application.

While the exaggerated dimensions provided in the figures do not provide a completely aesthetically accurate impression, it can be observed in FIG. 5 that the inclusion of the reducing segment and the use of pole members having different outside diameters provides a completed pole joint structure which has a smooth outer surface and a pleasing appearance. Furthermore, when utilizing a reducing segment, the bottom end of the female component of the joint structure protrudes little, if at all, beyond the outside diameter of the lower pole member. Thus, the embodiment represented in FIG. 5 may have particular application where a pole joint structure is desired which minimizes the chance of a person scraping against the end of the female component and thus reducing any possibility of injury.

Figure 6:
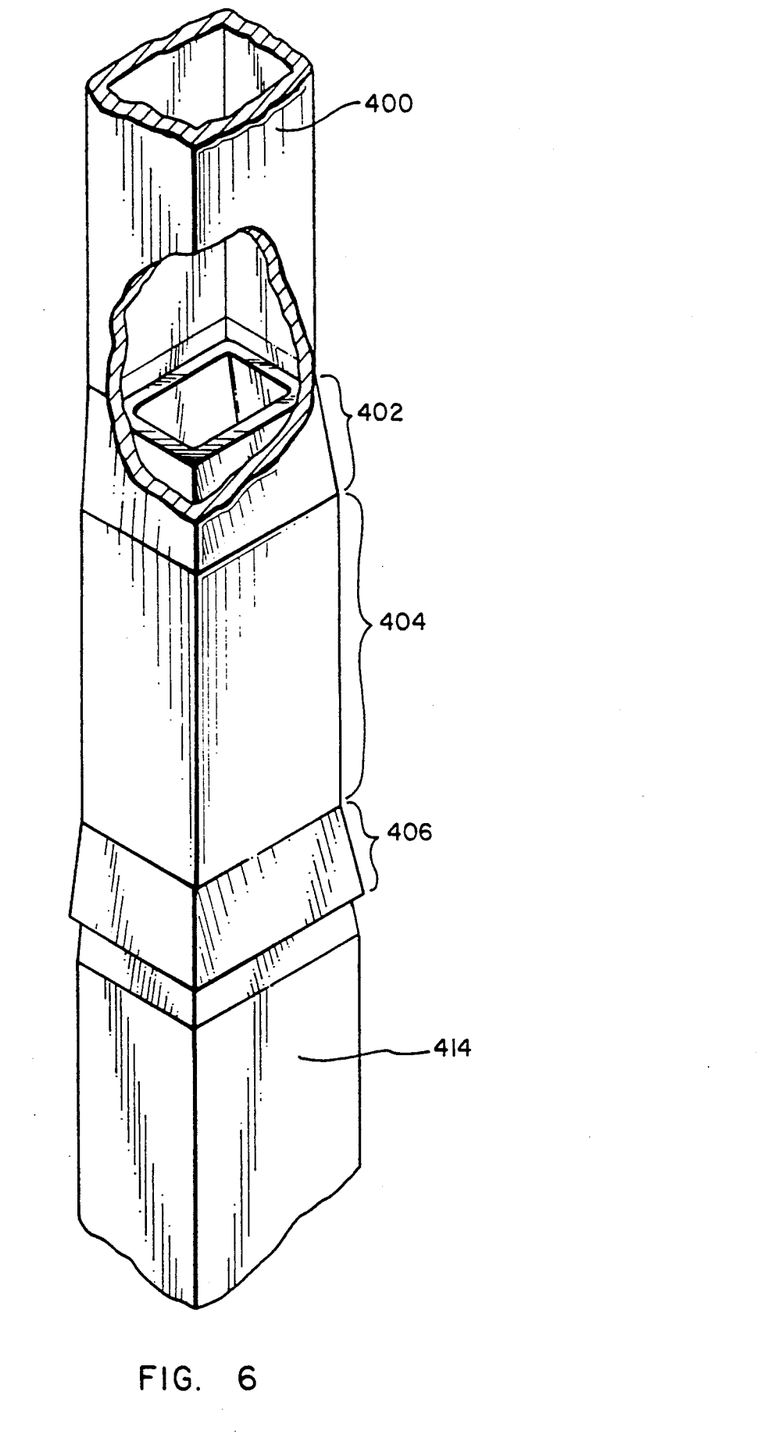
FIG. 6 is a perspective view of a fourth presently preferred embodiment used to join pole members having a rectangular exterior shape.

FIG. 6 is a partially cut-away perspective view of a fourth presently preferred embodiment of the present invention. The fourth preferred embodiment has been fabricated using upper and lower pole members, 400 and 414, respectively, having a rectangular cross-sectional shape. The embodiment illustrated in FIG. 6 includes diverging segments such as indicated at 402 and 406, substantially straight segments such as shown at 404, and converging segments (not visible) all of which are formed in accordance with the previously explained principles.

While the cylindrical pole members represented in FIGS. 1-5 may be used in most applications, some applications may require that the pole members be of a non-circular cross-section. FIG. 6 illustrates one arrangement of the present invention with non-circular pole members.

In many cases, it is desired to permanently join two pipe members. That is, join the two pipe members in such a way that is not intended to be disassembled and such that the joint resists disassembly. In such cases, the principles of the present invention may be used to form a pole joint structure wherein a friction weld occurs to permanently join the two pole members.

Figure 7:
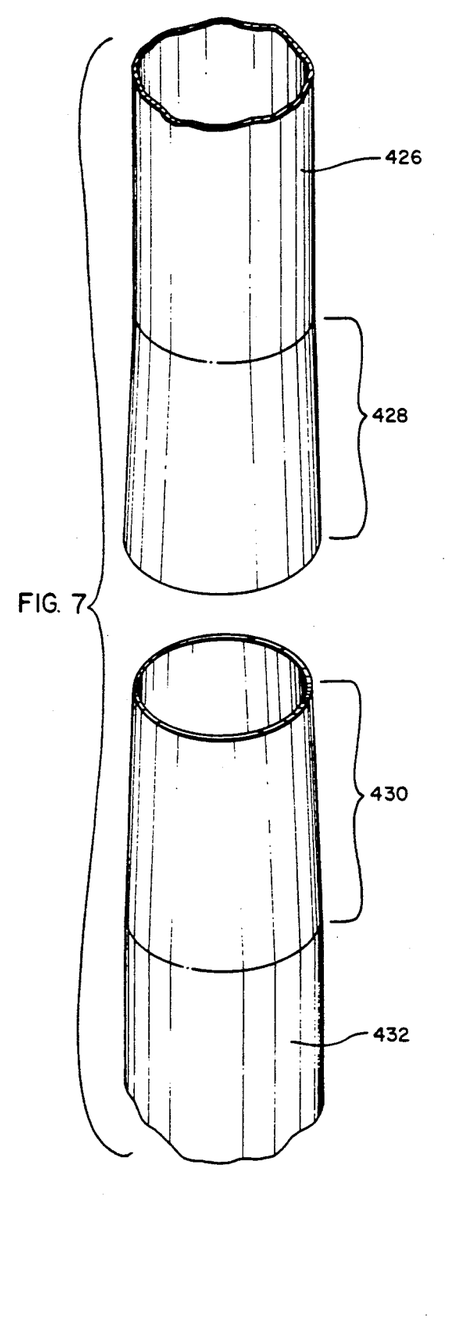
FIG. 7 is an exploded perspective view of a fifth presently preferred embodiment of the present invention provided with only a single diverging segment and a single converging segment formed on the male and female components, respectively, of thin wall steel tubing.

FIG. 7 provides an exploded perspective view of a fifth embodiment of the present invention. The embodiment illustrated in FIG. 7 includes a female diverging segment, indicated at bracket 428, provided at the lower end of upper pole member 426 and a male converging segment, indicated at bracket 430, provided at the upper end of lower pole member 43. To assemble the joint, male converging segment 430 is inserted into female diverging segment 428. As downward pressure is exerted on the upper pole member, the mating surfaces of the joint become joined together so that the joint resists rotation and disassembly and effectively becomes a permanent joint. The described fifth embodiment makes effective use of thin wall tubing while forming a joint which may be described as self-tightening.

Figure 8:
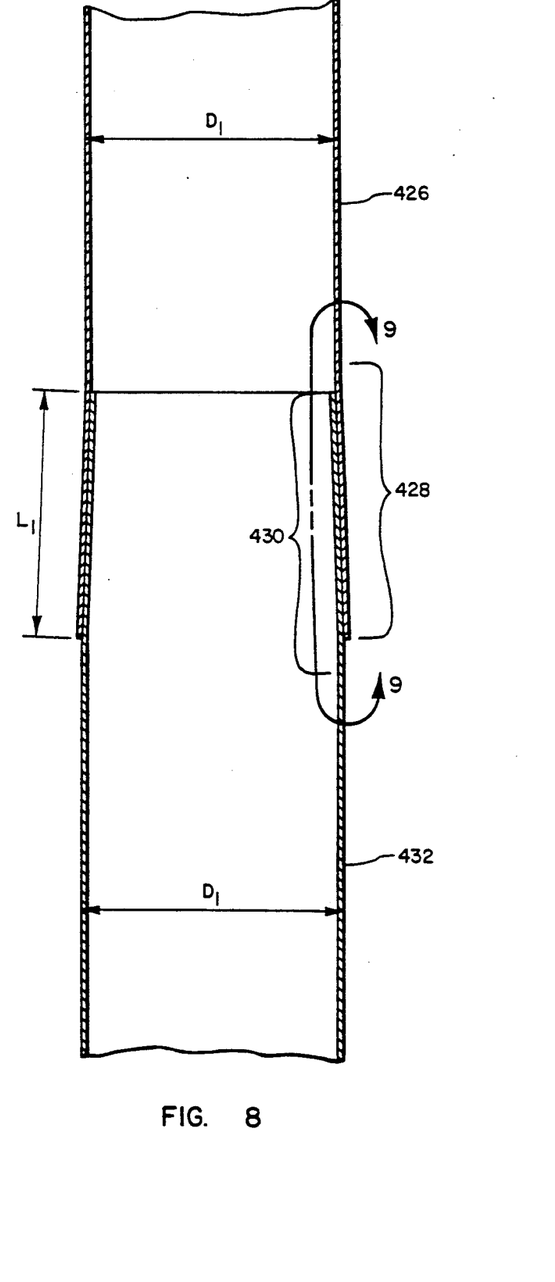
FIG. 8 is a cross-sectional view of the embodiment illustrated in FIG. 7 with the male and female components assembled.

As shown in the cross-sectional view of FIG. 8, the distance which the diverging segment and the converging segment extend into one another is designated $L_1$. Furthermore, the diameters of pole members 426 and 432 are designated $D_1$. As can been seen in the cross-sectional views, the cylindrical tubing used is generally thin wall tubing wherein the diameter of the tubing $D_1$ is much greater than the thickness of the pole member wall.

FIG. 8 provides a cross sectional view of the fifth embodiment illustrated in FIG. 7. The mating surfaces of diverging segment 428 and converging segment 430 are shown in mating contact. The large contact area of the mating surfaces provides a secure friction fit which becomes more secure with use.

Furthermore, as can be observed in FIG. 8, there is no ledge or edge on the lower pole member 432 upon which upper pole member 426 can come to rest. It will be appreciated that since no structure is provided upon which upper pole member 426 may come to rest, as the joint structure illustrated in FIG. 8 is subjected to rigorous use, diverging segment 428 may experience some slight additional outward spreading while converging segment may experience some slight additional inward compression. This further "settling" of the diverging segment onto the converging segment results in an increased $L_1$ and augments the strength of the joint and enhances the friction weld formed between the two mating surfaces.

Figure 9:
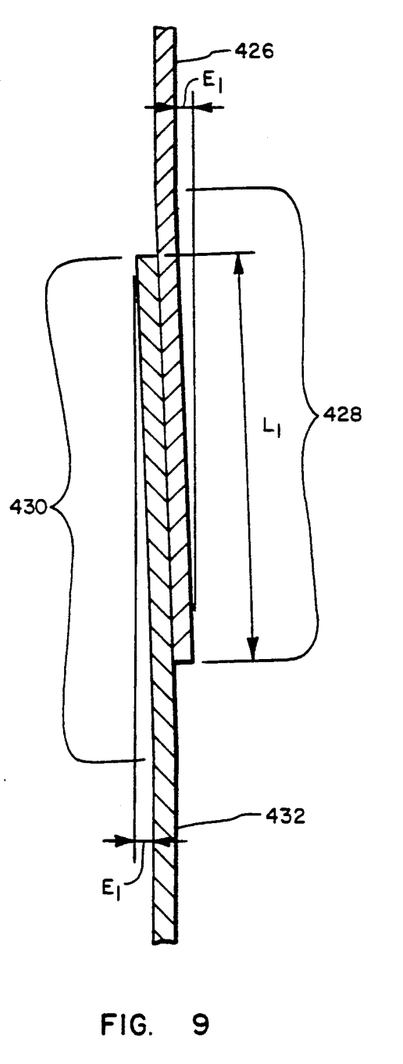
FIG. 9 is an enlarged cross-sectional view taken along line 9—9 of FIG. 8.

FIG. 9 provides an enlarged cross-sectional view of the mating surfaces of the joint. As mentioned, it is desireable that the angles (as measured from the pole member's central axis or a surface parallel thereto) shown at $E_1$ in FIG. 9 be identical. Since the embodiment illustrated in FIG. 9 is intended to create a permanent friction weld joint, the angle E is preferably shallow.

As can be observed in FIG. 9, the total divergence or convergence of the pole members is not more than about one wall thickness. This gives an aesthetically pleasing appearance to the joint and reduces the chance of injury due to contact with a protruding edge of upper pole member 426.

The embodiments of the present invention described herein advantageously do not require that the wall thickness of the pole members be reduced at the site of the joint structure. Since the wall thickness may remain constant, the strength of the joint is not reduced as it is in some prior art structures performing similar functions.

Furthermore, leaving the wall thickness constant allows the fabrication of the described embodiments to be simpler than if extra fabrication steps were required to reduce the wall thickness at the site of the joint structures. Since the pole member wall diverges only approximately one wall thickness, a aesthetically pleasing and functioning joint structure is achieved. Those skilled in the art will appreciate, however, that the process used to form the presently preferred embodiments may cause the wall thickness to vary somewhat. Such variations should not be significant to the function of the embodiment and may be unavoidable with some materials.

In the presently preferred embodiments of the invention, it is preferred that angle $E_1$ fall within the range from about 0.25° to about 2.5°. However, in order to form the most permanent joint it is preferred that angle $E_1$ be in the range from about 0.75° to about 2.0°.

The embodiment represented in FIG. 7-9 is particularly suited for use as an outdoor basketball standard. Importantly, the embodiments described herein are particularly suited for formation on thin-wall tubing. The preferred various parameters of the illustrated fifth embodiment are shown below in Table A where all values are approximate.

TABLE A

| Parameter | Value |
|---|---|
| $D_1$ | 4.5 inches |
| $L_1$ | 5.0 inches |
| Angle $E_1$ | 1° |
| Wall thickness | 0.083 inches |

Figure 10:
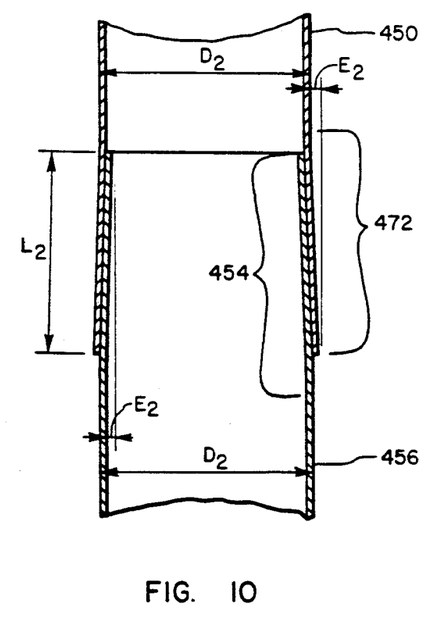
FIG. 10 is a cross-sectional view of a sixth presently preferred embodiment of the present invention fabricated using thin wall tubing.

A sixth presently preferred embodiment of the present invention is represented in the cross-sectional view of FIG. 10. The embodiment illustrated in FIG. 10 is adapted for use in applications similar to those which the embodiment illustrated in FIGS. 7-9 is adapted to fulfill but in which a pole member of a smaller diameter is desired.

As represented in FIG. 10 the sixth embodiment includes a female diverging segment 452 formed on an upper pole member 450 and a male converging segment 454 formed on a lower pole member 456. The preferred various parameters of the illustrated sixth embodiment are shown below in Table B where all values are approximate.

TABLE B

| Parameter | Value |
|---|---|
| $D_2$ | 3.5 inches |
| $L_2$ | 4.0 inches |
| Angle $E_2$ | 0.9° |
| Wall thickness | 0.065 inches |

Figure 11:
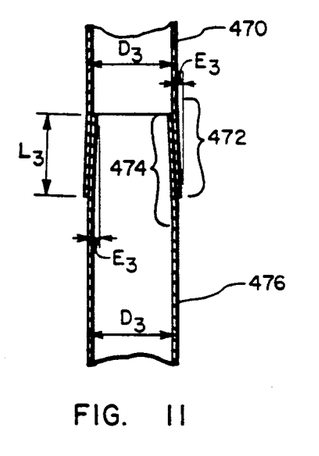
FIG. 11 is a cross-sectional view of a seventh presently preferred embodiment of the present invention fabricated using thin wall tubing.

A seventh presently preferred embodiment of the present invention is represented in the cross-sectional view of FIG. 11. The embodiment illustrated in FIG. 11 is fabricated from a thinner wall tubing than the previously described fifth and sixth embodiments and is adapted for use in less rigorous applications.

As represented in FIG. 11 the seventh embodiment includes a female diverging segment 472 formed on an upper pole member 470 and a male converging segment 474 formed on a lower pole member 476. The preferred various parameters of the illustrated seventh embodiment are shown below in Table C where all values are approximate.

TABLE C

| Parameter | Value |
|---|---|
| $D_3$ | 1.5 inches |
| $L_3$ | 1.6 inches |
| Angle $E_3$ | 1.8° |
| Wall thickness | 0.049 inches |

One of the great advantages of the present invention is the method which can be used to form the joint structures found on both the male and female components. Those skilled in the art of working metals will realize that a one-step or two-step process (depending upon the equipment available) of swaging the male or female components can be carried out using dies which can be fabricated by those having experience in the applicable art.

Once the dies are prepared the cylindrical pole members, such as illustrated in the figures herein, may be pressed into the appropriate die to form the structures of either the male component or the female component in one operation. In the case of fabricating embodiments similar to those illustrated in FIGS. 7-11, the necessary degree of taper may require that the swaging tools be of a particularly hard tool steel and that the equipment used be capable of exerting more pressure than might be generally used when forming pole members of a particular size. Thus, it is generally advantageous to use one of several lubricants known to those skilled in the pertinent art during the forming process.

The ability to form the structures of either the male or the female component of the present invention in a one or two-step operation allows the present invention to be much more economically formed than any joint structure which requires bolts and nuts, screws, or other fasteners and the accompanying holes which must be provided therefor.

Moreover, when fabricating the structures of the present invention on metallic pipe or tubing, the forming operation has several other advantages. In many cases, butt-welded seams occasionally protrude from the surface of the pipe and may interfere with the joining of conventional joint structures. With the present invention, problems due to the protrusion of the tubular weld seams are corrected during the forming operation. Furthermore, it is not unusual for tubing diameter, and particularly wall thickness, to vary from section to section and the presently described forming operation compensates for any minor differences in tubing diameter. Still further, since the cutting of the pipe to reduced length sections often leaves burrs or other debris which may interfere with the proper mating of the joint structures, the forming operation advantageously also corrects such defects. Overall, the present invention provides a joint structure which may be economically formed and is better suited to serve in a variety of applications than any previously available structure.

The present invention provides a pole joint structure which overcomes the disadvantages which accompany the previously available joint structures. The joint structure of the present invention prevents undesirable lateral deflection even under rigorous use.

Moreover, the joint structure may be fabricated to provide a fit which is permanent if desired. In contrast to the prior art structures, the joint of the present invention may be fabricated so it actually becomes tighter as it is used. Embodiments of the present invention take particular advantage of strength-to-weight ratio of thin wall tubing. The present invention may be adapted for use in a variety of applications with different shaped pole members and manufactured from different materials.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A joint structure for joining a first pole member and second pole member in friction tight engagement each being tubular and having substantially the same outer dimension and substantially constant wall thickness along their length, the pole joint resisting rotational movement, inadvertent disassembly, and lateral deflection, the joint structure comprising:

a first diverging segment configured along a portion of the inner surface of the first pole member spaced from a first end of the first pole member, the first end forming a female component of the joint structure, the wall thickness of the first pole member being substantially constant at the first diverging segment;

a first converging segment configured along a portion of the outer surface of the second pole member adjacent to a second end of the second pole member, the second end forming a male component of the joint structure, the wall thickness of the second pole member being substantially constant at the first converging segment, the angle of divergence of the first diverging segment and the angle of the first converging segment being such that at least a circular contact occurs between the inner surface of the first diverging segment and the outer surface of the first converging segment such that the mating of the first diverging and first converging segments forms a first contact friction tight for the pole joint structure;

a second diverging segment configured along a portion of the inner surface of the first pole member positioned adjacent the first end of the first pole member, said first and second diverging segments diverging a selected amount so that their combined lateral divergence is equal to not more than one wall thickness of the pole members; and a second converging segment configured along a portion of the outer surface of the second pole member spaced a distance form the second end of the second pole member, the angle of divergence of the second diverging segment and the angle of convergence of the second converging segment being such that at least a annular contact occurs between the inner surface of the second diverging segment and the outer surface of the second converging segment such that when the second end of the second pole member is inserted into a female component provided on the first pole member, a friction tight pole joint is formed which is able to resist rotational movement, inadvertent disassembly, and lateral deflection.

2. A joint structure for joining a first pole member and a second pole member as defined in claim 1 wherein the angle of convergence of the first converging segment and the angle of divergence of the second diverging segment is in the range from about 0.1 degrees to about 25 degrees.

3. A joint structure for joining a first pole member and a second pole member as defined in claim 1 wherein the angle of convergence of the first converging segment and the angle of divergence of the second diverging segment is in the range from about 0.25 degrees to about 15 degrees.

4. A joint structure for joining a first pole member and a second pole member as defined in claim 1 wherein the angle of convergence of the first converging segment and the angle of divergence of the second diverging segment is in the range from about 0.5 degrees to about 8 degrees.

5. A joint structure for joining a first pole member and a second pole member as defined in claim 1 wherein the first converging segment and the second converging segment are spaced apart from each other on the second pole member.

6. A joint structure for joining a first pole member and a second pole member as defined in claim 1 wherein a substantially straight segment is provided between the first diverging segment and the second diverging segment on the first pole member.

7. A joint structure for joining a first pole member and a second pole member as defined in claim 1 wherein the first and second pole members are solid along at least a portion of their length.

8. A joint structure for joining a first pole member and a second pole member as defined in claim 1 wherein the first and the second pole members are tubular.

9. A joint structure for joining a first pole member and a second pole member as defined in claim 8 wherein the length and angle of divergence of the first and second diverging segments is such that each of their divergence is equal to less than 70% of the thickness of the pole member tubular wall.

10. A joint structure for joining a first pole member and a second pole member as defined in claim 1 wherein the first and second pole members are adapted to be joined together to form a basketball standard.

11. A joint structure for joining a first pole member and a second pole member as defined in claim 1 wherein the joint structure is provided with a key means for aligning the first pole member and the second pole member in fixed rotational alignment.

12. A joint structure for joining a first pole member and a second pole member as defined in claim 1 wherein the first pole member has an outer diameter between said first and second diverging segments which is greater than an outer diameter of the second pole member between said first and second converging segments.

13. A joint structure for joining a first pole member and a second pole member as defined in claim 1 wherein the first and second pole members have a rectangular exterior shape.

14. A joint structure for joining a male tubular pole member having both inner and outer surfaces and a female tubular pole member having both inner and outer surfaces, the completed joint being resistant to disassembly after being assembled, the structure comprising:
 a first diverging segment provided on the female pole member inner surface immediately adjacent to a first end of the female pole member;
 a second diverging segment provided on the female pole member inner surface spaced a distance from the first end of the female pole member;
 a first substantially straight segment formed on the female pole member inner surface between the first diverging segment and the second diverging segment;
 a first converging segment provided on the male pole member outer surface immediately adjacent to a first end of the male pole member, the shape and dimensions of at least a portion of the first converging segment complementing the shape and dimensions of the first diverging segment;
 a second converging segment provided on the male pole member outer surface spaced a distance from the first end of the male pole member, the shape and dimensions of at least a portion of the second converging segment complementing the shape and dimensions of the second diverging segment;
 a second substantially straight segment formed on the male pole member outer surface between the first converging segment and the second converging segment, the first straight segment and the second straight segment being of a length so that the first end of the male pole member may be inserted into the first end of the female pole member and a secure pole joint formed thereby which resists disassembly and maintains the first and second pole members in axial alignment.

15. A joint structure for joining a male pole member and a female pole member as defined in claim 14 wherein the angle of convergence of the second converging segment and the angle of divergence of the second diverging segment are equal and are in the range from about 0.1 degrees to about 25 degrees.

16. A joint structure for joining a male pole member and a female pole member as defined in claim 14 wherein the angle of convergence of the second converging segment and the angle of divergence of the second diverging segment is in the range from about 0.25 degrees to about 15 degrees.

17. A joint structure for joining a male pole member and a female pole member as defined in claim 14 wherein the angle of the convergence of the second diverging segment is in the range from about 0.5 degrees to about 8 degrees.

18. A joint structure for joining a male pole member and a female pole member as defined in claim 14 wherein the first and second pole members are solid along at least a portion of their length.

19. A joint structure for joining a male pole member and a female pole member as defined in claim 14 wherein the first and the second pole members are tubular.

20. A joint structure for joining a male pole member and a female pole member as defined in claim 19 wherein the length and angle of divergence of the first and second diverging segments is such that their total lateral divergence is equal to not more than the thickness of the pole member tubular wall.

21. A joint structure for joining a male pole member and a female pole member as defined in claim 14 wherein the first and second pole members are adapted to be joined together to form a basketball standard.

22. A joint structure for joining a male pole member and a female pole member as defined in claim 14 wherein the joint structure is provided with a key means for aligning the first pole member and the second pole member in rotational alignment.

23. A joint structure for joining a male pole member and a female pole member as defined in claim 14 wherein the male pole member has an outer diameter which is less than the outer diameter of the female pole member.

24. A joint structure for joining a male pole member and a female pole member as defined in claim 14 wherein the male and female pole members have a rectangular exterior shape.

25. A joint structure capable of securely joining a first tubular pole member to a second tubular pole member having an end embedded in the ground so that the second tubular pole member is substantially vertical, the joint structure comprising:
 a female component formed at one end of the first tubular pole member, the female component comprising:
  a first outward tapered segment provided on the interior wall spaced a distance from the end of the first pole member and having a first beginning point and a first ending point, the lateral deviation of the first ending point relative to the first beginning point being between about 20% and about 80% of the wall thickness of the first tubular pole member;
  a second outward tapered segment provided on the interior wall adjacent to the end of the first pole member having a second beginning point and a second ending point, the lateral deviation of the second ending point relative to the second beginning point being between about 20% and about 80% of the wall thickness of the first tubular pole member;
  a substantially straight segment formed on the first tubular pole member between the first outward tapered segment and the second outward tapered segment;
 a male component formed at the upward pointing end of the second tubular pole member, the male component comprising:
  a first inward tapered segment provided on the exterior wall adjacent to the end of the second pole member and having a third beginning point and a third ending point, the lateral deviation of the third ending point relative to the third beginning point being between about 20% and about 80% of the wall thickness of the second tubular pole member;

a second inward tapered segment provided on the exterior wall spaced a distance from the end of the second tubular pole member and having a fourth beginning point and a fourth ending point, the lateral deviation of the fourth ending point relative to the fourth beginning point being between about 20% and about 80% of the wall thickness of the second tubular pole member; and a substantially straight segment formed on the second tubular pole member between the first inward tapered segment and the second inward tapered segment of a length such that mating contact between the inward tapered segments occurs with the corresponding outward tapered segments when the male component is inserted into the female component such that the resulting pole joint is secure, laterally stable, and resistant to both rotational movement and longitudinal disassembly.

26. A joint structure for joining a first tubular pole member and a second tubular pole member as defined in claim 25 wherein the first outward tapered segment and the second outward tapered segment are tapered a selected amount so that their combined lateral deviation is not greater than about the wall thickness of the tubular pole member.

27. A joint structure for joining a first pole member and a second pole member as defined in claim 25 wherein the outward tapered segments are oriented at an angle in relation to the first tubular pole member central axis which is in the range from about 0.25 degrees to about 15 degrees.

28. A joint structure for joining a first pole member and a second pole member as defined in claim 25 wherein the outward tapered segments are oriented at an angle in relation to the first tubular pole member central axis which is in the range from about 0.5 degrees to about 8 degrees.

29. A joint structure for joining a first tubular pole member and a second tubular pole member as defined in claim 25 wherein the first and second tubular pole members are adapted to be joined together to form a basketball standard.

30. A joint structure for joining a first tubular pole member and a second tubular pole member as defined in claim 25 wherein the joint structure is provided with a key means for aligning the first tubular pole member and the second tubular pole member in rotational alignment.

31. A joint structure for joining a first tubular pole member and a second tubular pole member as defined in claim 25 wherein the first pole member has an outer diameter which is less than the outer diameter of the second pole member.

32. A joint structure for joining a first cylindrical pole member and a second cylindrical pole member so that the joint forms a permanent friction tight union of the two pole members, each pole member being generally cylindrical and having a substantially constant wall thickness equal to less than 25% of the diameter of the cylindrical pole members and each of the pole members having outer diameters which are within 25% of the outer diameter of the other pole member adjacent to where the joint structure is formed, the joint structure comprising:

a converging segment configured along a portion of the first cylindrical pole member at a first end of the cylindrical pole member, the outer surface of the converging segment uniformly and linearly converging towards the longitudinal center of the first cylindrical pole member, the wall thickness of the cylindrical pole member being substantially constant at the converging segment, the convergence of the outer surface of the converging segment being not more then 25% greater than one wall thickness of the first cylindrical pole member, the angle of convergence of the outer surface of the converging segment being in a range from about 0.25 degrees to less than about 4.0 degrees in relation to the longitudinal center of the first cylindrical pole member; and a diverging segment configured along a portion of the second cylindrical pole member at a first end of the second cylindrical pole member, the inner surface of the diverging segment uniformly and linearly diverging away from the longitudinal center of the second cylindrical member, the wall thickness of the second cylindrical pole member being substantially constant at the diverging segment, the divergence of the inner surface of the diverging segment being not more than 25% greater than one wall thickness of the second cylindrical pole member, the angle of divergence of the inner surface of the diverging segment being substantially the same as the angle of convergence of the outer surface of the converging segment, the wall thicknesses of the first and second cylindrical pole members remaining substantially the same in the converging and diverging segments such that when the converging segment is inserted into the diverging segment a secure, friction tight pole joint is created which becomes permanent as it is used and which is able to withstand lateral deflection.

33. A joint structure for joining a first cylindrical pole member and a second cylindrical pole member so that the joint forms a permanent union of the two pole members as defined in claim 32 wherein the first and second cylindrical pole members are solid along a portion of their length.

34. A joint structure for joining a first cylindrical pole member and a second cylindrical pole member so that the joint forms a permanent union of the two pole members as defined in claim 32 wherein the diverging and converging segments are at least as long as the diameter of the first pole member.

35. A joint structure for joining a first cylindrical pole member and a second cylindrical pole member so that the joint forms a permanent union of the two pole members as defined in claim 32 wherein the wall thickness of the first and second cylindrical pole members is less than 10% of the diameter of the first pole member.

36. A joint structure for joining a first cylindrical pole member and a second cylindrical pole member so that the joint forms a permanent union of the two pole members as defined in claim 32 wherein the angle of convergence of the outer surface of the converging segment is in the range from about 0.5 degrees to less than about 2.0 degrees in relation to the longitudinal center of the first pole member.

37. A joint structure for joining a first cylindrical pole member and a second cylindrical pole member so that the joint forms a permanent union of the two pole members as defined in claim 32 wherein the length of the converging and diverging segments are at least equal to the smallest diameter of the cylindrical pole members.

38. A joint structure for joining a first cylindrical pole member and a second cylindrical pole member so that the joint forms a permanent union of the two pole members as defined in claim 32 wherein the first and the second cylindrical pole members have substantially the same diameter.

39. A joint structure for joining a first cylindrical pole member and a second cylindrical pole member so that the joint forms a permanent union of the two pole members as defined in claim 32 wherein the first and second cylindrical pole members are adapted to be joined together to form a basketball standard.

40. A joint structure for joining a first cylindrical pole member and a second cylindrical pole member so that the joint forms a permanent union of the two pole members as defined in claim 32 wherein the first cylindrical pole member has an outer diameter which is less than the outer diameter of the second cylindrical pole member.

41. A joint structure for joining a first cylindrical pole member and a second cylindrical pole member so that the joint forms a permanent union of the two pole members as defined in claim 32 wherein the convergence of the outer surface of converging segment is not more than about one wall thickness of the first pole member and the divergence of the inner surface of the diverging segment is not more than about one wall thickness of the second pole member.

42. A structure for forming a permanent, friction tight joint between a first thin wall cylindrical pole member and a second thin wall cylindrical pole member, each of the thin wall cylindrical pole members having a substantially constant wall thickness equal to less than 5% of the diameter of the thin wall cylindrical pole members and each of the thin wall cylindrical pole members having substantially equal outer diameters, the structure comprising:

a converging segment configured along a portion of the first thin wall cylindrical pole member at a first end of the first thin wall cylindrical pole member, the outer surface of the converging segment uniformly and linearly converging toward the longitudinal center of the first thin wall cylindrical pole member, the convergence of the outer surface of the converging segment being not more than about one wall thickness of the first thin wall cylindrical pole member; and a diverging segment configured along a portion of the second thin wall cylindrical pole member at a first end of the second thin wall cylindrical pole member, the inner surface of the diverging segment uniformly and linearly diverging away from the longitudinal center of the second thin wall. cylindrical member, the divergence of the inner surface of the diverging segment being not more than about one wall thickness of the second thin wall cylindrical pole member, the wall thicknesses of the first and second thin wall cylindrical pole members remaining substantially constant in the converging and diverging segments such that when the converging segment is inserted into the diverging segment a friction weld pole joint is created which becomes permanent as it is used and which is able to withstand lateral deflection.

43. A structure for forming a permanent joint between a first thin wall cylindrical pole member and a second thin wall cylindrical pole member as defined in claim 42 wherein the outer surface of the converging segment has an angle of convergence in the range from about 0.75 degrees to less than about 2.0 degrees in relation to the longitudinal center of the first thin wall cylindrical pole member and the inner surface of the diverging segment has an angle of divergence substantially the same as the angle of convergence.

44. A structure for forming a permanent joint between a first thin wall cylindrical pole member and a second thin wall cylindrical pole member as defined in claim 42 wherein the length of the converging and diverging segments are at least equal to 75% of the smallest diameter of the cylindrical pole members.

45. A structure for forming a permanent joint between a first thin wall cylindrical pole member and a second thin wall cylindrical pole member as defined in claim 42 wherein the first and second cylindrical pole members are adapted to be joined together to form a basketball standard.

46. A structure for forming a permanent joint between a first thin wall cylindrical pole member and a second thin wall cylindrical pole member as defined in claim 42 wherein the diameter of the pole member is in the range from about 1 inch to about 5 inches.

47. A structure for forming a permanent joint between a first thin wall cylindrical pole member and a second thin wall cylindrical pole member as defined in claim 42 wherein the diameter of the pole member is in the range from about 3.5 inches to about 5 inches.

48. A structure for forming a permanent joint between a first thin wall cylindrical pole member and a second thin wall cylindrical pole member as defined in claim 42 wherein the first and second pole members comprise thin wall steel tubing.

49. A joint structure for creating a friction weld permanent joint between an upper cylindrical pole member and a lower cylindrical pole member, each pole members having a substantially the same outer diameter which is at least as great as one inch and having a substantially constant wall thickness equal to not more than 10% of the outer diameter of the pole members, the joint structure comprising:

a converging segment configured along a portion of the lower cylindrical pole member at a first end of the lower cylindrical pole member, the outer surface of the converging segment uniformly and linearly converging towards the longitudinal center of the lower cylindrical pole member, the convergence of the outer surface of the converging segment being equal to approximately one wall thickness of the lower cylindrical pole member, the angle of convergence of the outer surface of the converging segment being in the range from about 0.75 degrees to about 2.0 degrees in relation to the longitudinal center of the lower cylindrical pole member; and a diverging segment configured along a portion of the upper cylindrical pole member at a first end of the upper cylindrical pole member, the inner surface of the diverging segment uniformly and linearly diverging away from the longitudinal center of the upper cylindrical member, the divergence of the inner surface of the diverging segment being approximately equal to one wall thickness of the upper cylindrical pole member, the angle of divergence of the inner surface of the diverging segment being substantially the same as the angle of convergence of the outer surface of the converging segment, the wall thicknesses of the upper and lower cylindrical pole members remaining substantially constant in the converging and diverging segments such that when the converging segment is inserted into the diverging segment a secure, friction tight pole joint is created which becomes permanent as it is used and which is able to withstand lateral deflection.

50. A basketball goal standard comprising:

an upper basketball goal standard member, the upper basketball goal standard member being generally cylindrical and adapted to support a basketball goal;

a lower basketball goal standard member, the lower basketball goal standard member being generally cylindrical, each basketball goal standard member having a substantially constant wall thickness equal to less than 25% of the diameter of the basketball goal standard members and each of the basketball goal standard members having outer diameters which are within 25% of the outer diameter of the other basketball goal standard member adjacent to where a joint structure is formed to join in friction tight engagement the upper and the lower basketball goal standard members so that the joint forms a permanent friction tight union of the basketball goal standard members;

a converging segment configured along a portion of the lower basketball goal standard member forming a male joint component, the converging segment being provided on a first end of the lower basketball goal standard member, the outer surface of the converging segment uniformly and linearly converging towards the longitudinal center of the lower basketball goal standard member, the wall thickness of the lower basketball standard member being substantially constant at the converging segment, the convergence of the outer surface of the converging segment being not more than 25% greater than one wall thickness of the lower basketball goal standard member, the angle of convergence of the outer surface of the converging segment being in the range from about 0.25 degrees to less than about 4.0 degrees in relation to the longitudinal center of the lower basketball goal standard member; and a diverging segment configured along a portion of the upper basketball goal standard member forming a female joint component, the diverging segment being provided on a first end of the upper basketball goal standard member, the inner surface of the diverging segment uniformly and linearly diverging away from the longitudinal center of the upper basketball goal standard member, the wall thickness of the upper basketball goal standard member being substantially constant at the diverging segment, the divergence of the inner surface of the diverging segment being not more than 25% greater than one wall thickness of the upper basketball goal standard member, the angle of divergence of the inner surface of the diverging segment being substantially the same as the angle of convergence of the outer surface of the converging segment, the wall thicknesses of the upper and lower basketball goal standard members remaining substantially constant in the converging and diverging segments such that when the converging segment is inserted into the diverging segment a secure, friction tight pole joint is created which becomes permanent as the basketball goal standard is used and is able to withstand lateral deflection encountered by a basketball goal standard during use.

51. A basketball goal standard comprising:

an upper basketball goal standard member, the upper basketball goal standard member being generally cylindrical and adapted to support a basketball goal;

a lower basketball goal standard member, the lower basketball goal standard member being generally cylindrical, each basketball goal standard member having a substantially constant wall thickness equal to less than 25% of the diameter of the basketball goal standard members and each of the basketball goal standard members having outer diameters which are within 25% of the outer diameter of the other basketball goal standard member adjacent to where a joint structure is formed to join in friction tight engagement the upper and the lower basketball goal standard members so that the joint forms a permanent friction tight union of the basketball goal standard members;

a converging segment configured along a portion of the upper basketball goal standard member forming a male joint component, the converging segment being provided on a first end of the upper basketball goal standard member, the outer surface of the converging segment uniformly and linearly converging toward the longitudinal center of the upper basketball goal standard member, the wall thickness of the upper basketball standard member being substantially constant at the converging segment, the convergence of the outer surface of the converging segment being not more than 25% greater than one wall thickness of the upper basketball goal standard member, the angle of convergence of the outer surface of the converging segment being in the range from about 0.25 degrees to less than about 4.0 degrees in relation to the longitudinal center of the upper basketball goal standard member; and a diverging segment configured along a portion of the lower basketball goal standard member forming a female joint component, the diverging segment being provided on a first end of the lower basketball goal standard member, the inner surface of the diverging segment uniformly and linearly diverging away from the longitudinal center of the lower basketball goal standard member, the wall thickness of the lower basketball goal standard member being substantially constant at the diverging segment, the divergence of the inner surface of the diverging segment being not more than 25% greater than one wall thickness of the lower basketball goal standard member, the angle of divergence of the inner surface of the diverging segment being substantially the same as the angle of convergence of the outer surface of the converging segment, the wall thicknesses of the upper and lower basketball goal standard members remaining substantially constant in the converging and diverging segments such that when the converging segment is inserted into the diverging segment a secure, friction tight pole joint is created which becomes permanent as the basketball goal standard is used and is able to withstand lateral deflection encountered by a basketball goal standard during use.

* * * * *